United States Patent [19]

Henmi et al.

[11] Patent Number: 5,184,243

[45] Date of Patent: Feb. 2, 1993

[54] OPTICAL TRANSMITTING APPARATUS FOR MINIMAL DISPERSION ALONG AN OPTICAL FIBER

[75] Inventors: Naoya Henmi; Tetsuyuki Suzaki; Tomoki Saito, all of Tokyo, Japan

[73] Assignee: NEC Corporation, Tokyo, Japan

[21] Appl. No.: 620,111

[22] Filed: Nov. 30, 1990

[30] Foreign Application Priority Data

Nov. 30, 1989 [JP] Japan .................................. 1-310930
Aug. 31, 1990 [JP] Japan .................................. 2-232218
Sep. 5, 1990 [JP] Japan .................................. 2-234993
Sep. 5, 1990 [JP] Japan .................................. 2-234994

[51] Int. Cl.$^5$ .......................................... H04B 10/04
[52] U.S. Cl. .................................. 359/181; 359/154
[58] Field of Search ............... 359/123, 124, 133, 161, 359/162, 158, 161, 162, 180, 181, 182, 186, 188; 375/60; 332/160, 163

[56] References Cited

U.S. PATENT DOCUMENTS 4,933,929 6/1990 Tajima .................................. 359/182

Primary Examiner—Edward L. Coles, Sr.
Assistant Examiner—R. Bacares
Attorney, Agent, or Firm—Sughrue, Mion, Zinn, Macpeak & Seas

[57] ABSTRACT

A plurality of transmitting signal lights are supplied from a semiconductor laser light source which is modulated by a current having adjusted amplitude and phase injected thereinto in an optical transmitting apparatus. The signal lights are modulated in intensity by a plurality of external modulators, and a time-difference is applied among the signal lights. Thus, the signal lights are combined to provide a transmitting signal light which is propagated through a transmission line. At this time, a frequency component having a low transmission speed is supplied to the transmission line earlier than a frequency component having a fast transmission speed in compliance with a wavelength dispersion property of the transmission line.

6 Claims, 14 Drawing Sheets

TRANSMITTING
SIGNAL WAVEFORM
(PRIOR TO TRANSMISSION)

TRANSMITTED SIGNAL
WAVEFORM AFTER
100 km TRANSMISSION
WITHOUT PRECHIRP

TRANSMITTED SIGNAL
WAVEFORM AFTER
100 km TRANSMISSION
IN THE INVENTION
(WITH PRECHIRP)

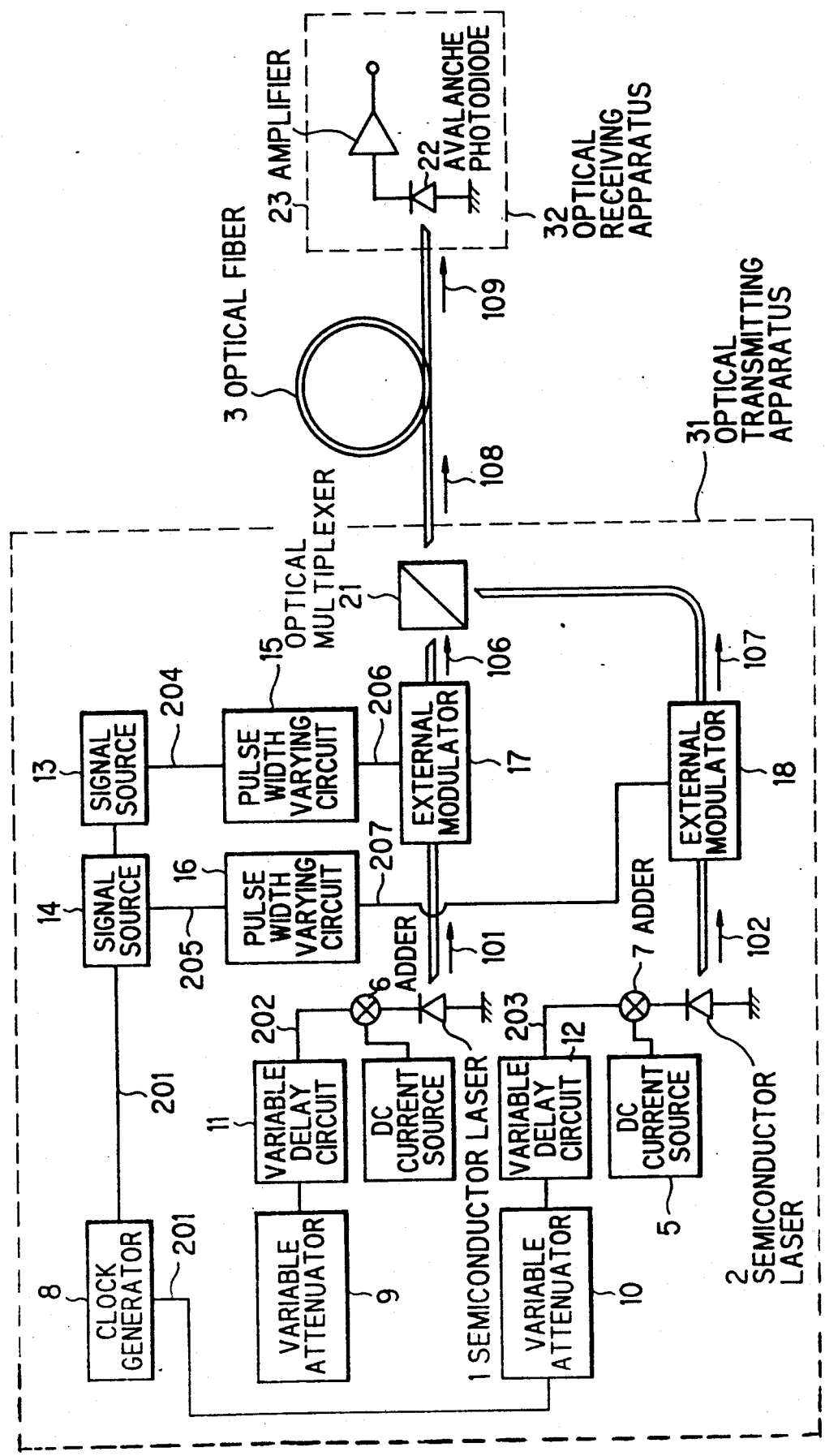

PRIOR TO
TRANSMISSION

AFTER 150 km
TRANSMISSION
WITHOUT PRECHIRP

AFTER 150 km
TRANSMISSION
IN THE INVENTION
(WITH PRECHIRP)

OPTICAL TRANSMITTING APPARATUS FOR MINIMAL DISPERSION ALONG AN OPTICAL FIBER

FIELD OF THE INVENTION

This invention relates to an optical transmitting apparatus, and more particularly to, an optical transmitting apparatus adapted to an optical communication system, etc.

BACKGROUND OF THE INVENTION

In an optical communication system, intensity modulated signal light is obtained by changing a current injected into a semiconductor laser. The intensity modulated signal light is propagated through an optical fiber of a transmission line to be received by a light receiving apparatus utilizing a photoelectric conversion element such as a PIN diode device, etc. This system which is defined "an intensity modulated - direct detection system" is mainly utilized in the optical communication system. In this optical communication system, it is known that quality-degradation of transmitted light occurs due to the influence of optical fiber dispersion, when light transmission is carried out at a transmission speed of more than gigabit by using signal light of 1.5 $\mu m$ wavelength band, at which the loss of an optical fiber becomes the lowest value. This is explained, for instance, in the report of "Long-distance Gigabit-Range Optical Fiber Transmission Experiments Employing DFB-LD's and InGaAs-APD's" described in pages of 1488 to 1497 of "IEEE, Journal of Lightwave Technology, Vol. LT-5, No.10" by M. Shikada et al.

On the other hand, in an optical heterodyne communication system, in which information is regenerated from beat obtained in accordance with the mixture of oscillation light at an optical receiving apparatus receiving the information carried on frequency, phase or amplitude of light from an optical transmitting apparatus, the influence of optical fiber dispersion is low as compared to an optical communication system using intensity modulation-direct detection, because there is no influence of spectrum extension due to chirping which occurs at the time of direct modulation of a semiconductor laser. However, it is reported that degradation occurs in a light transmission of a ultra high speed and a long distance, for instance, as explained in "Chromatic Dispersion Equalization in an 8 Gb/s 202 km CPSK Transmission Experiment" of 17th Conference on Integrated Optics and Optical Fiber Communication, Post-deadline Papers 20 PDA-13" by N. Takachio et al.

In addition, research of an optical amplifier and a direct amplification repeating system using the optical amplifiers has been carried out intensively recently for instance, as explained in "516 km 2.5 Gb/s Optical fiber Transmission Experiment using 10 Semiconductor Laser Amplifiers and Measurement of Jitter Accumulation" of 17th Conference on Integrated Optics and Optical Fiber communication, Post-deadline Papers 20 PDA-9" by S. Yamamoto et al.

In such direct amplification repeating systems, it is expected that a light transmission of a ultra long distance will be realized, because the transmission distance can be extended by compensating the loss of signal light.

As understood from the above, signal light is subject to the loss of a power and the distortion of waveform due to the influence of optical fiber dispersion. Thus, a signal light transmission distance is limited by the power loss and the influence of dispersion. In a high speed transmission of more than several Gb/s, the distance is mainly limited by the influence of dispersion, prior to the consideration of the limitation due to the power loss, because the extension of spectrum exists in signal light due to modulation thereof to increase the influence of dispersion. On the other hand, in a ultra long distance transmission using optical amplifiers as amplifying repeaters, the distance is limited by the influence of dispersion, although the limitation of a power loss is compensated by the optical amplifiers.

Dispersion of an optical fiber is caused by the difference of times, in which signal lights having different frequencies supplied to an input terminal of the optical fiber are propagated therethrough. Therefore, if the extension of spectrum exists in the signal lights, waveforms of the signal lights are distorted through the transmission thereof. For instance, when signal lights of 1.5 $\mu m$ band are propagated through a zero-dispersion optical fiber of 1.3 $\mu m$ band, a short wavelength component of the signal lights (a high frequency signal component) has a high transmission speed, while a long wavelength component of the signal light (a low frequency signal component) has a low transmission speed. Therefore, the high frequency signal component is converged at the front portion of a transmitted pulse, and the low frequency signal component is converged at the rear portion thereof. As a result, the transmitted pulse is subject to the distortion of waveform, so that the discrimination of symbols such as mark and space tends to be impossible.

A method for compensating the waveform distorsion resulted from the aforementioned dispersion is proposed by "Dispersion Compensation by Active Predistorted Signal Synthesis" described on pages 800 to 805 of "IEEE, Journal of Lightwave Technology, Vol. LT-3, No. 4" by T.L. Koch et al. In this method, light emitted from a semiconductor laser is modulated in frequency, and the frequency-modulated light is modulated in intensity by an ideal external modulator of LiNbO$_3$, so that signal light is predistorted to be low in frequency at the front portion of one pulse and high in frequency at the rear portion thereof. Then, the predistorted signal light is propagated through an optical fiber. Consequently, it is reported that an extended amount of a pulse width is decreased in the transmitted signal light pulse.

The ideal external modulator is a modulator which applies only intensity-modulation to input light. Such an ideal external modulation is realized by an external modulator of LiNbO$_3$. In fact, however, this LiNbO$_3$ modulator provides undesirable phase-modulation simultaneously with intensity-modulation due to the existence of an asymmetrical electrode structure. Even in a semiconductor absorption type modulator which is expected to be integrated with a semiconductor laser, undesirable phase-modulation is generated together with intensity modulation, as explained in "Frequency Chirping in External Modulators" described on pages 87 to 93 of "IEEE, Journal of Lightwave Technology, Vol. 6, No. 1, Jan. 1988" by F. Koyama et al. In accordance with the undesirable phase modulation, one of two phenomenons, in which an extended amount of a transmitted pulse width is increased or decreased is found. In the former LiNbO$_3$ modulator, the extended amount can be decreased, as explained in "10 Gb/s Transmission in Large-Dispersion Fiber Using a Ti:-LiNbO$_3$ Mach-Zehnder Modulator" described on pages 208 and 209 of "Technical digest of 17th International Conference on Integrated Optics and Optical Fiber Communication, Vol. 3, Kobe, Japan 1989" by T. Okiyama et al. The latter semiconductor modulator is known to increase the extended amount.

A method, in which output light of a semiconductor laser is modulated in frequency, and the frequency-modulated light is modulated in intensity by an ideal LiNbO$_3$ external modulator, so that the modulated light is propagated through an optical fiber, is defined "prechirp method" hereinafter, and the transmitting wave is defined "prechirp wave" hereinafter.

However, this prechirp method has a disadvantage in that it is difficult to be adapted to an NRZ format, in which a pulse width is not constant to be more than one time slot, although it can be adapted to codes such as a RZ format, in which a pulse width is constant to be less than one time slot, because frequency-shift of one direction is carried out within one pulse. In this connection, a RZ format has a disadvantage in that a signal band is extended, and the influence of dispersion is large, because the RZ format utilizes a signal having a narrow pulse width as compared to the NRZ format.

The prechirp method has a further disadvantage in that the size is large, and the cost is high, when a LiNbO$_3$ modulator is used, because the LiNbO$_3$ modulator is large in size and high in cost as compared to a semiconductor electro-absorption modulator which can be integrated with a semiconductor laser to provide a small-sized transmitting apparatus.

The prechirp method has a still further disadvantage in that an extended amount of a pulse width is large in a transmitted pulse due to the generation of undesirable phase-modulation, when an external modulator having a property of generating phase-modulation simultaneously with intensity modulation is used.

SUMMARY OF THE INVENTION

Accordingly it is an object of this invention to provide an optical transmitting apparatus which can be adapted to an NRZ format.

It is a further object of this invention to provide an optical transmitting apparatus which can be small in size and low in cost.

It is a still further object of this invention to provide an optical transmitting apparatus, in which an extended amount of a transmitted pulse width is small.

According to this invention, an optical transmitting apparatus, comprises:

a semiconductor laser light source for emitting a frequency-modulated light by modulating a current injected thereinto;

a clock signal source for generating a clock signal modulating the injected current;

means for adjusting an amplitude and a phase of the clock signal;

transmitting signal sources of n in number for generating transmitting signals of n in number in synchronous with the clock signal, where n is a positive integer;

means for dividing the frequency-modulated light into signal lights of n in number to be propagated through light paths of n in number, correspondingly;

external modulators of n in number for modulating in intensity the n divided signal lights to provide intensity-modulated lights of n in number, correspondingly, by the n transmitting signals;

means for providing a time difference among the n intensity-modulated lights; and means for combining the n intensity-modulated lights to be propagated through a transmission line;

wherein the adjusting means adjusts the amplitude and the phase of the clock signal, so that the n intensity-modulated lights are supplied to the transmission line in a time-order of frequency components having slow to fast transmission speeds in compliance with a wavelength dispersion property of the transmission line; and the providing means is provided at position selected from positions between the dividing means and a corresponding one of the external modulators and between the corresponding one and the combining means.

In an optical transmitting apparatus according to this invention, it is considered that frequency-modulated light is obtained by modulating a current injected into a semiconductor laser by a signal equal to a period of a clock signal, and the frequency-modulated light is modulated in intensity to be propagated through an optical fiber by an external modulator. At this time, it is set that a pulse has a low frequency component of a low transmission speed at the front portion thereof, and a high frequency component of a high transmission speed at the rear portion thereof. Such a transmitting wave is defined "prechirp wave", as described before. Therefore, a permissible dispersion amount of a transmission line, above which distortion occurs in a transmitted pulse, becomes larger than that in an ordinary transmission having no frequency-modulated. Furthermore, when frequency-shift of the frequency-modulated light emitted from the semiconductor laser has approximately linear frequency-change in a pulse, the permissible dispersion amount becomes the maximum value, and an optimum frequency-shift amount changes dependent upon a pulse width.

An optimum prechirp wave is easily generated by adjusting a phase-difference between a clock signal modulating a current injected into a semiconductor laser and a modulated signal. In an NRZ format, however, an optimum prechirp wave is not obtained by use of a clock signal, because a transmission pulse width is one time slot. However, if a signal such as an NRZ format having a broad pulse width is used, a transmission band is compressed, and a permissible dispersion amount of a transmission line can be large.

BRIEF DESCRIPTION OF THE DRAWINGS

This invention will be explained in more detail in conjunction with appended drawings, wherein:

FIG. 5 is a block diagram showing an optical transmitting apparatus in a second preferred embodiment according to the invention;

DESCRIPTION OF THE PREFERRED EMBODIMENTS

Figure 1:
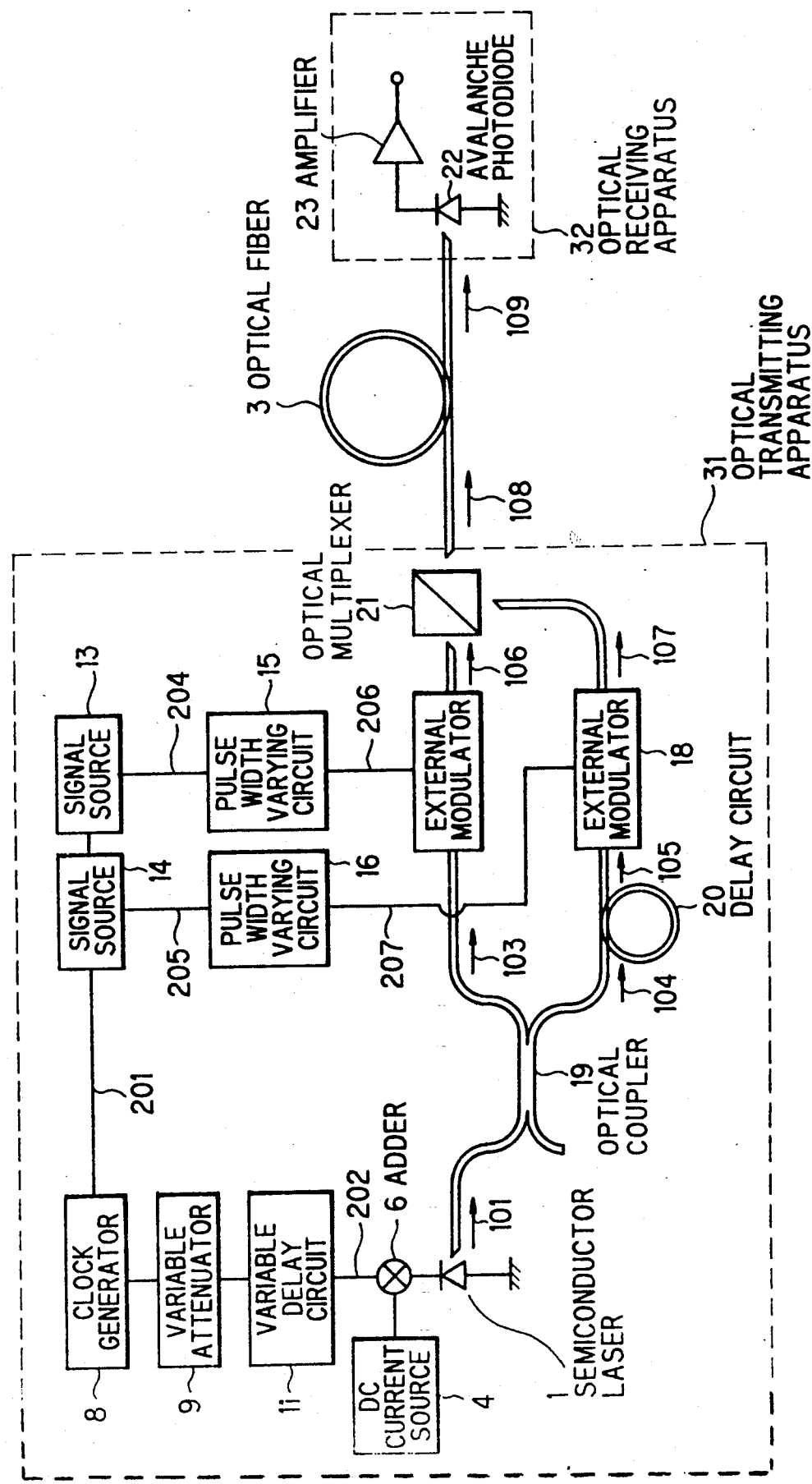
FIG. 1 is a block diagram showing an optical transmitting apparatus in a first preferred embodiment according to the invention.

FIG. 1 shows an optical transmitting apparatus in a first preferred embodiment according to the invention, wherein two transmitting signal sources are provided. The optical transmitting apparatus 31 is connected through an optical fiber 3 to an optical receiving apparatus 32, and includes a semiconductor laser source 1, which oscillates with a single vertical mode at a band of 1.5 $\mu$m as an output device for supplying a frequency-modulated light obtained by modulating a current injected thereinto. An adder 6 for adding a bias current supplied from a direct current source 4 to a frequency-modulated signal 202 supplied from an adjusting circuit consisting of a variable attenuator 9 and a variable delay circuit 11, which adjust an amplitude and a phase of a clock signal 201 supplied from a clock generator 8, is connected to the semiconductor laser 1, from which an output light of a frequency-modulated signal coupled to an input terminal of an optical coupler 19 is emitted. The optical coupler 19 divides the signal light 101 into first and second divisional lights 103 and 104. First and second signal sources 13 and 14 corresponding to the first and second divisional lights 103 and 104 are provided to generate 5 Gb/s RZ signals 204 and 205 in synchronous with a clock signal supplied from the clock generator 8. A first output terminal of the optical coupler 19 is connected to a first external modulator 17 of LiNbO$_3$ for modulating the first divisional light 103 by an intensity-modulated signal 206 which is generated in a pulse width varying circuit 15 in accordance with the receipt of a RZ signal 204 supplied from the first signal source 13. A second output terminal of the optical coupler 19 is connected through an optical delay circuit 20 for delaying the second divisional light 104 to provide a delayed light 105 to a second external modulator 18 of LiNbO$_3$ for modulating the delayed light 105 by an intensity-modulation signal 207 which is generated in a pulse width varying circuit 16 in accordance with the receipt of a RZ signal 205 supplied from the second signal source 14. The first and second external modulators 17 and 18 are connected to a polarized multiplexer 21, so that intensity-modulated lights 106 and 107 are supplied to the polarized multiplexer 21, from which a transmitting light 108 is supplied to the optical fiber 3 having zero-dispersion wavelength at a 1.3 $\mu$m band. The optical receiving apparatus 32 includes an avalanche photodiode 22 as a photoelectric conversion element for receiving a transmitted signal light 109 to provide an electric signal, and an amplifier for amplifying the electric signal to provide an information signal.

Figure 2A:
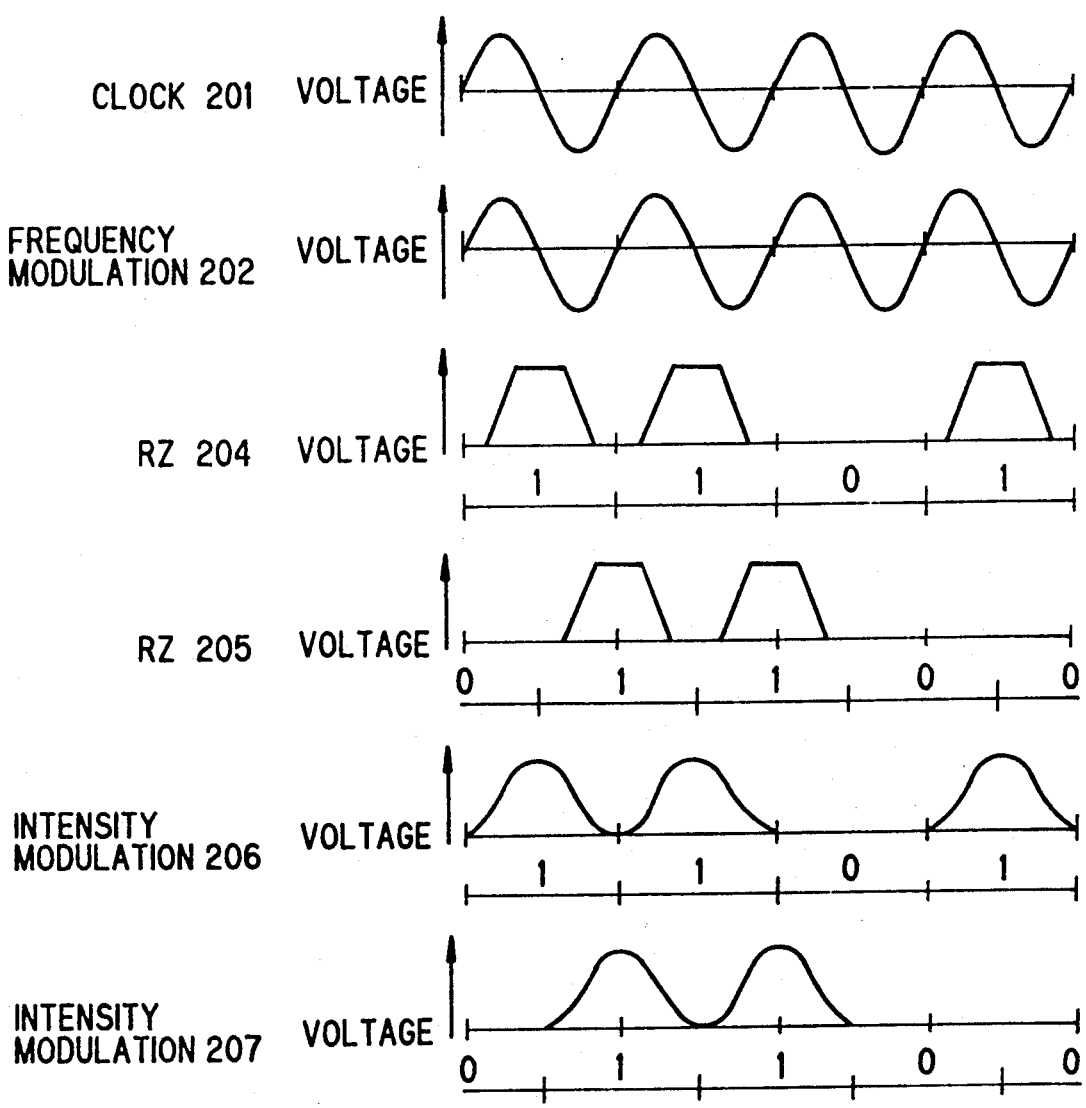
FIGS. 2A and 2B are explanatory diagrams showing waveforms of signals in the first preferred embodiment.
Figure 2B:
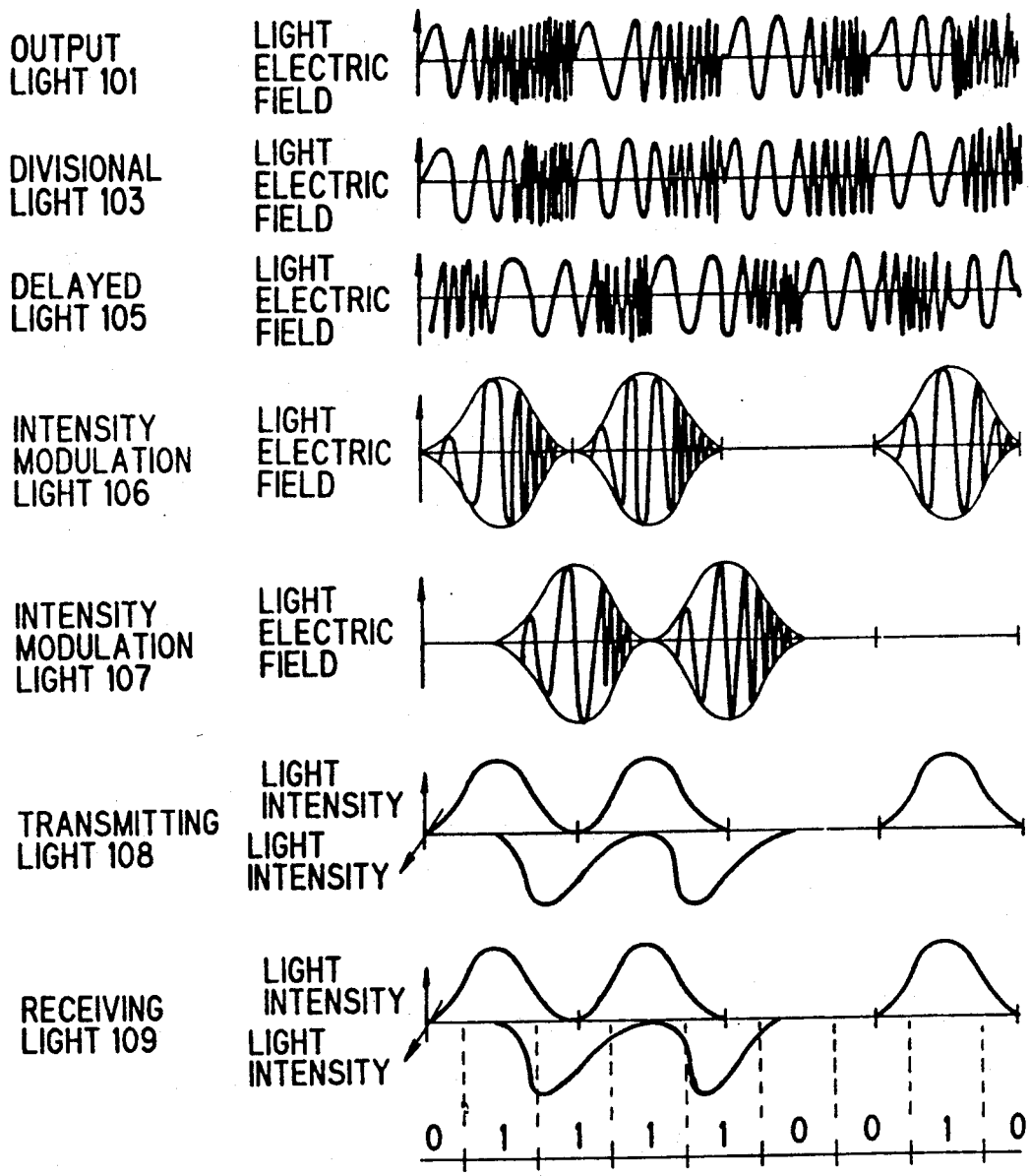

In operation, the RZ signals 204 and 205 are supplied from the signal sources 13 and 14 to the pulse width varying circuits 15 and 16, in which the RZ signals 204 and 205 are controlled to provide the intensity-modulated signals 206 and 207 having a phase difference of ½ time-slot, such that a width of a pulse is a half time one time-slot, as shown in FIG. 2. The variable delay circuit 11 delays the clock signal 201 to provide a frequency-modulated signal 202 having an adjustable phase difference relative to the intensity-modulated signals 206 and 207, so that the intensity-modulated signals 106 and 107 generated in the external modulators 17 and 18 have a low frequency component at a rising portion of a mark signal and a high frequency component at a falling portion thereof. In the polarized multiplexer 21, optical multiplexing having no loss can be carried out, so that an optical transmitting power of +2 dBm, which is larger than an optical transmitting power of −1 dBm obtained by use of an ordinary optical power combining coupler of 1:1 by 3 dB, is realized. Although the use of the 1:1 optical power combining coupler results in interference between symbols of two intensity-modulated signal lights, when the intensity-modulated signal lights 106 and 107 are supplied at the same time, the use of the polarized multiplexing coupler 21 provides no interference between the intensity-modulated signal lights 106 and 107. In FIGS. 2A and 2B, optical electric fields of the output light 101 of the semiconductor laser 1, the divisional light 103, the delayed light 105 of the divisional light 104, and the intensity-modulated signal lights 106 and 107 are shown, and light intensities of the transmitting signal light 108 and the transmitted signal light 109 are shown.

Figure 3A:
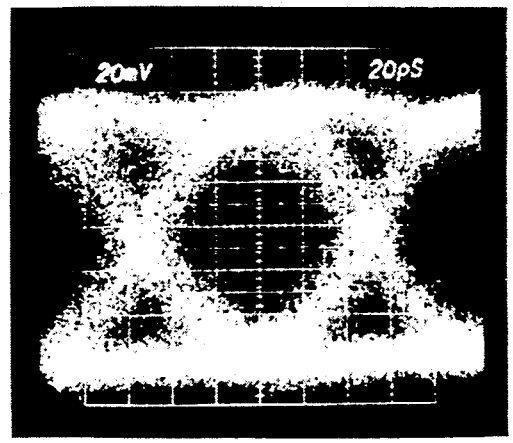
FIGS. 3A to 3C are explanatory diagrams showing waveforms of transmitting and transmitted signal lights in the first preferred embodiment.
Figure 3B:
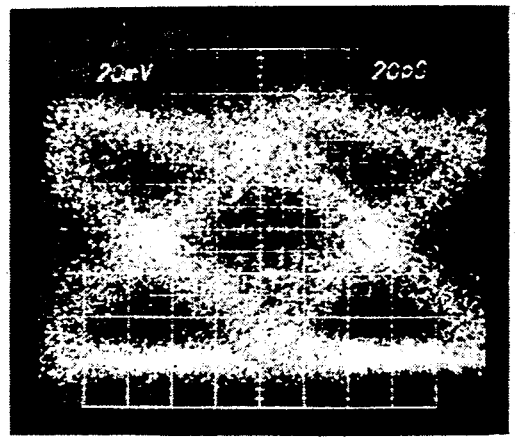
Figure 3C:
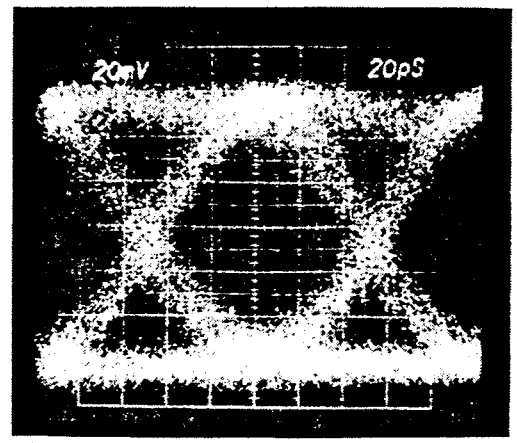

In this first preferred embodiment, an experiment was carried out. In a preparatory experiment using no apparatus of this first preferred embodiment, a transmission of an NRZ signal of 10 Gb/s which is the same bit rate as the aforementioned bit rate is carried out. In this transmission, an approximately 1 dB dispersion degradation power penalty occurred as a result of approximately 50 km transmission through an ordinary dispersion optical fiber having zero-dispersion at a wavelength of 1.3 $\mu$m. Then, in a transmission experiment using the optical transmitting apparatus 31 in this first preferred embodiment, two signal trains of 5 Gb/s are multiplexed. As a result, waveforms of transmitted signals as shown in FIG. 3B and 3C are obtained in a transmission length of 100 km, while FIG. 3A shows a waveform of a transmitting signal. In case of using no apparatus of this first preferred embodiment, a significant interference of codes occurs. On the other hand, in using the apparatus of this first preferred embodiment, the distortion is found to be small in the waveform of the signal transmitted by a transmission length of 100 km.

Figure 4:
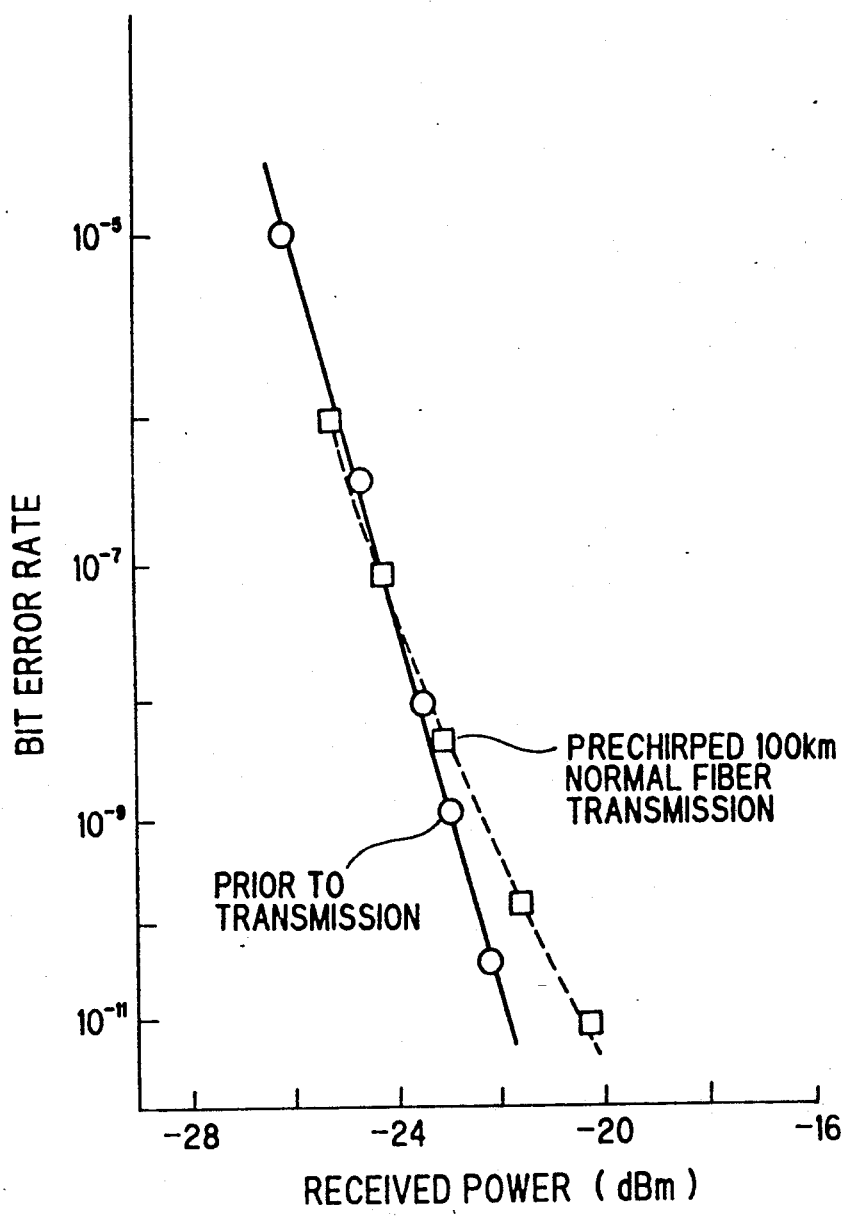
FIG. 4 is a graph showing a bit error rate relative to a received power in the first preferred embodiment.

FIG. 4 shows a bit error rate of codes in the signals transmitted by a transmission length of 100 km. It is clearly shown therein that approximately 0.2 dB degradation is only observed to provide a satisfactory signal receiving at an error rate of $10^{-9}$.

FIG. 5 shows an optical transmitting apparatus in the second preferred embodiment according to the invention. In this second preferred embodiment, two transmitting signal sources are provided. The optical transmitting apparatus 31 is connected through an optical fiber 3 to an optical receiving apparatus 32. Two semiconductor laser sources 1 and 2 which oscillate with a single vertical mode at a band of 1.5 $\mu$m to provide frequency-modulated lights by modulating currents injected thereinto are provided with added signals between a corresponding one of frequency-modulation signals 202 and 203 and a corresponding one of bias signals supplied from bias direct current sources 4 and 5. The frequency-modulated signals 202 and 203 are obtained in adjusting circuits, one of which consists of a variable attenuator 9 and a variable delay circuit 11, the other consists of a variable attenuator 10 and a variable delay circuit 12. The adjusting circuits are supplied with a 5 GHz clock signal 201 of a sine-wave from a clock generator 8, so that the frequency-modulated signals 202 and 203 having a predetermined phase relation are supplied to the adders 6 and 7 generating the added signals supplied to the semiconductor lasers 1 and 2, respectively. Output lights 101 and 102 which are modulated in frequency by the frequency-modulation signals 202 and 203 are supplied from the semiconductor laser 1 and 2. Two transmitting signal sources 13 and 14 generates RZ signals 204 and 205 of 5 Gb/s in synchronous with the clock signal of 5GHz supplied from the clock generator 8. The output lights 101 and 102 are modulated in intensity in external modulators 17 and 18 of $LiNbO_3$ by intensity-modulated signals 206 and 207 supplied from pulse width varying circuits 15 and 16 receiving the RZ signals 204 and 205 from the transmitting signal sources 13 and 14. As a result, intensity-modulated signals 106 and 107 are supplied to an optical multiplexer 21, so that the intensity-modulated signals 106 and 107 are multiplexed in time-division to be supplied as a polarized multiplexed transmitting signal light 108 coupled to an input terminal of an optical fiber 3 having zero-dispersion at a band of 1.3 μm. The transmitting signal light 108 is propagated through the optical fiber 3 to be a transmitted signal light 109 which is received by the optical receiving apparatus 32. In the receiving apparatus 32, an avalanche photodiode 22 converts the signal light 109 into an electric signal which is then amplified by an amplifier 23, so that information signal is obtained.

Figure 6A:
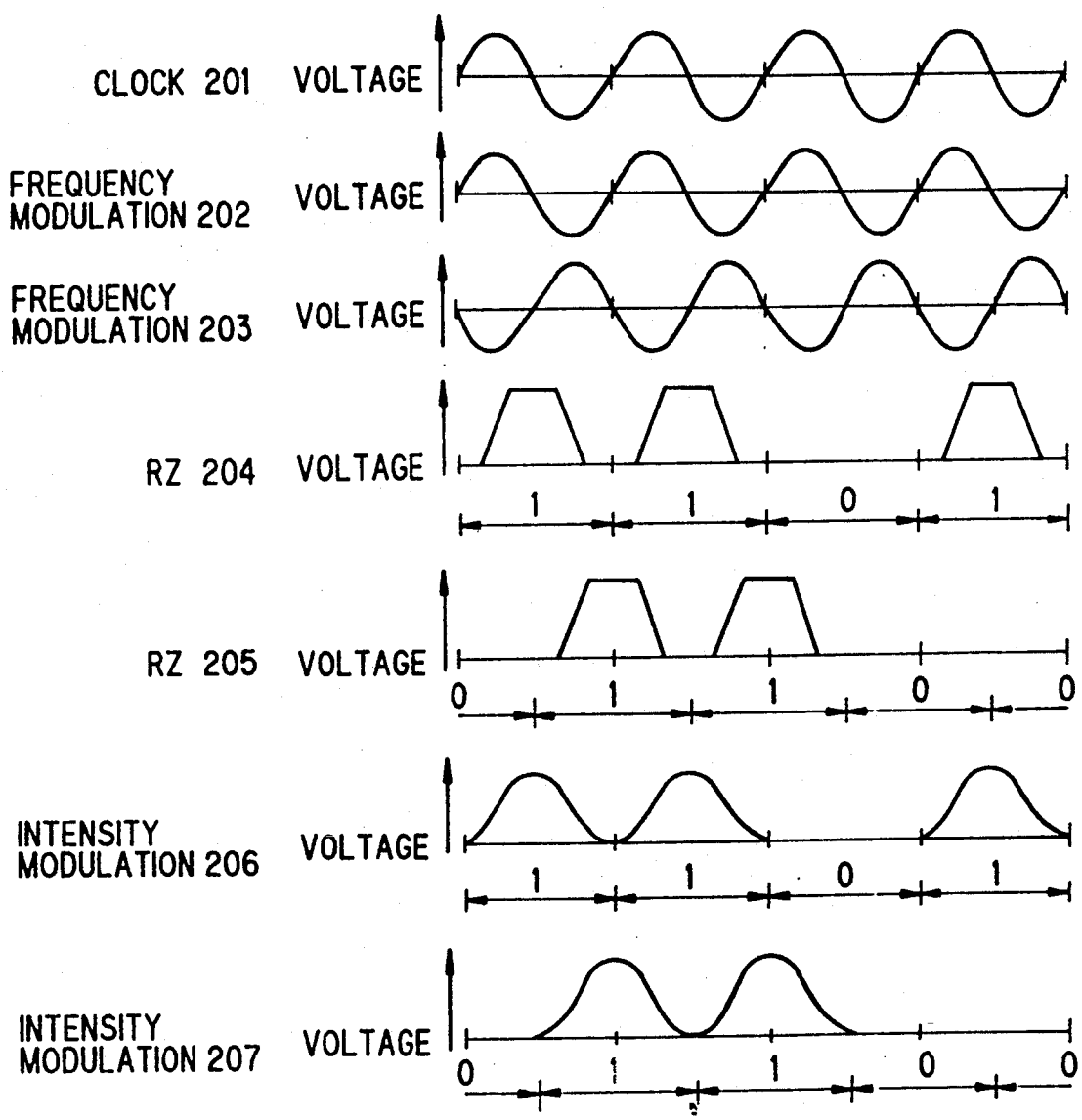
FIGS. 6A and 6B are explanatory diagrams showing waveforms of signals in the second preferred embodiment.
Figure 6B:
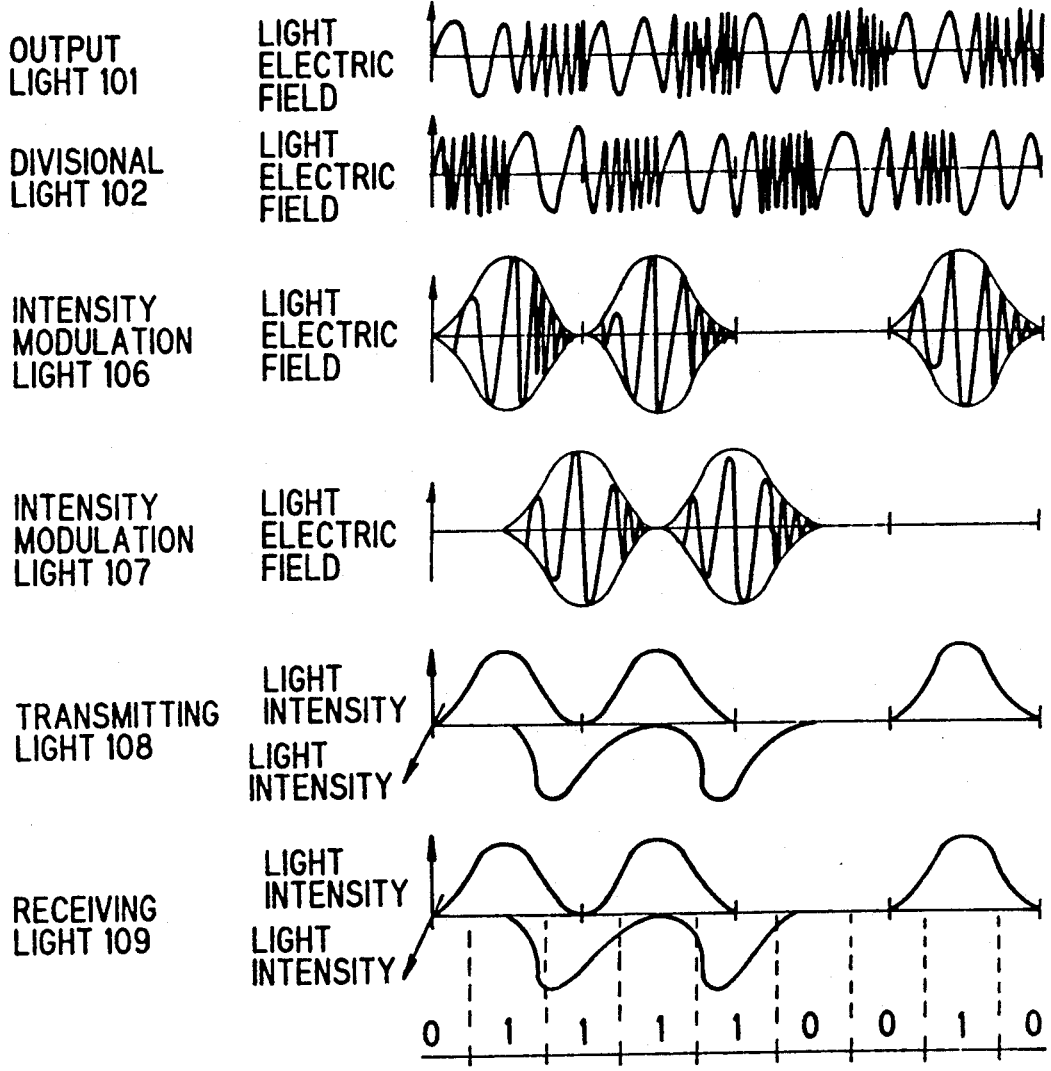

FIGS. 6A and 6B show the above described signals, and operation of the principal portions in this second preferred embodiment will be explained. The pulse width varying circuits 15 and 16 control the RZ signals 204 and 205, so that a phase difference of the intensity-modulated signals 206 and 207 is ½ time-slot, and a width of a pulse is a half time one time-slot. The variable delay circuits 11 and 12 control the clock signals attenuated by the variable attenuators 9 and 10 to adjust phase differences between a corresponding one of the frequency-modulated signals 202 and 203 and a corresponding one of the intensity modulated signals 206 and 207, so that each of the intensity-modulated signal lights 106 and 107 supplied from the external modulators 17 and 18 has a low frequency component at a rising portion of a mark signal and a high frequency component at a falling portion thereof. The polarized multiplexer 21 provides optical multiplexing having no loss, so that an optical transmitting power of +2 dBm is obtained. In a transmission experiment, it was confirmed that a dispersion degradation power penalty of approximately 0.2 dB which is almost the same result as in the first preferred embodiment was only observed in a transmission of 10 Gb/s and 100 km.

Figure 7:
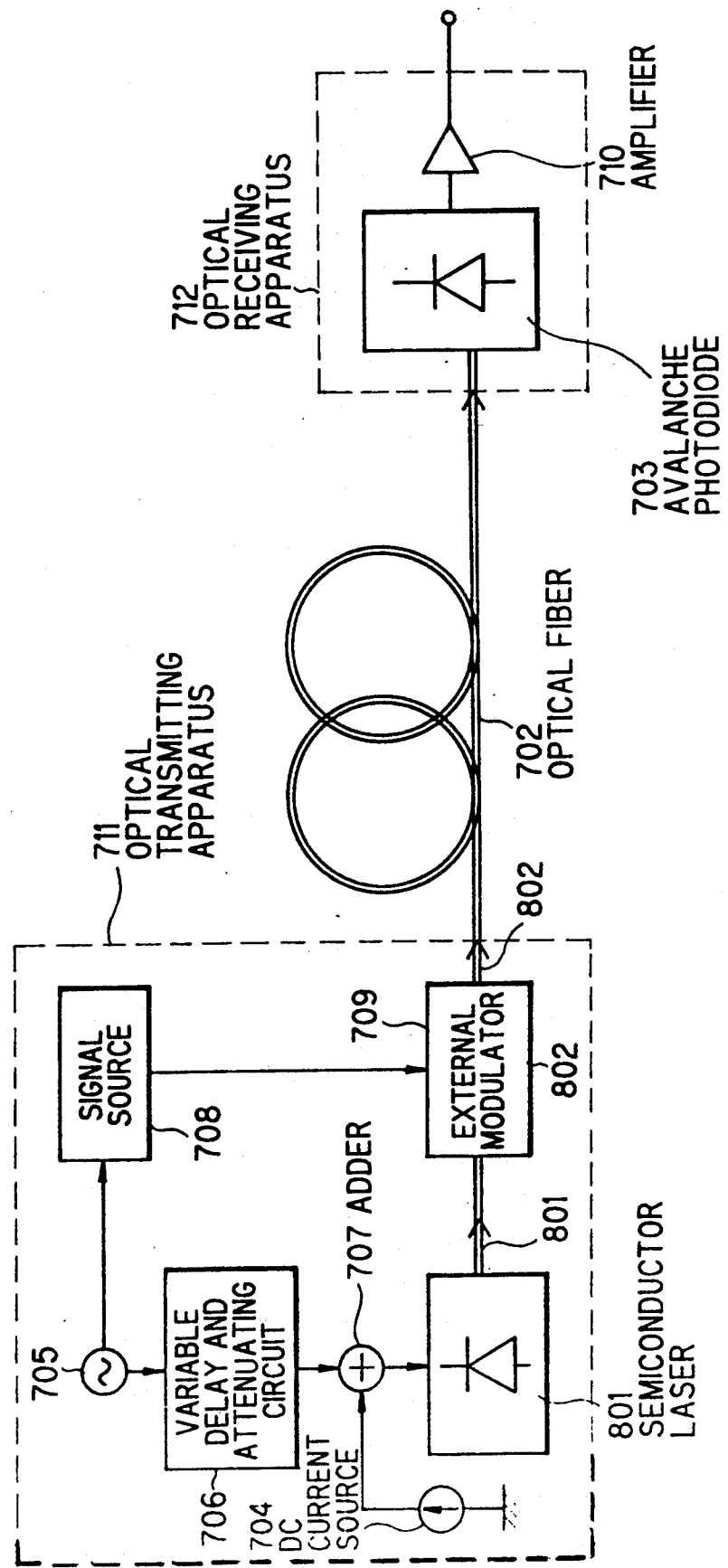
FIG. 7 is a block diagram showing an optical transmitting apparatus in a third preferred embodiment according to the invention.

FIG. 7 shows an optical transmitting apparatus in the third preferred embodiment according to the invention. In an optical transmitting apparatus 711, a clock signal of a sine wave having a frequency of 5 GHz is supplied from a clock generator 705. The clock signal is delayed and attenuated by a variable delay and attenuating circuit 706, and an addition between the clock signal thus delayed and attenuated and a bias direct current supplied from a direct current source 704 is carried out in an adder 707. The added signal is injected to a semiconductor laser 801, so that the semiconductor laser 801 oscillates with a single vertical mode at a band of 1.5 μm to emit a frequency modulated light 801. This optical light 801 is modulated in intensity by a semiconductor electro-absorption optical modulator 709 receiving a modulation signal from a signal source 708. A transmitting light 802 thus obtained is propagated through an optical fiber 702 of normal dispersion having zero-dispersion at a band of 1.3 μm to be received as a transmitted light 803 by an optical receiving apparatus 712. In the optical receiving apparatus 712, the received light 803 is converted into an electric signal by an avalanche photodiode 703, and the electric signal is amplified to provide information signal by an amplifier 710.

Figure 8:
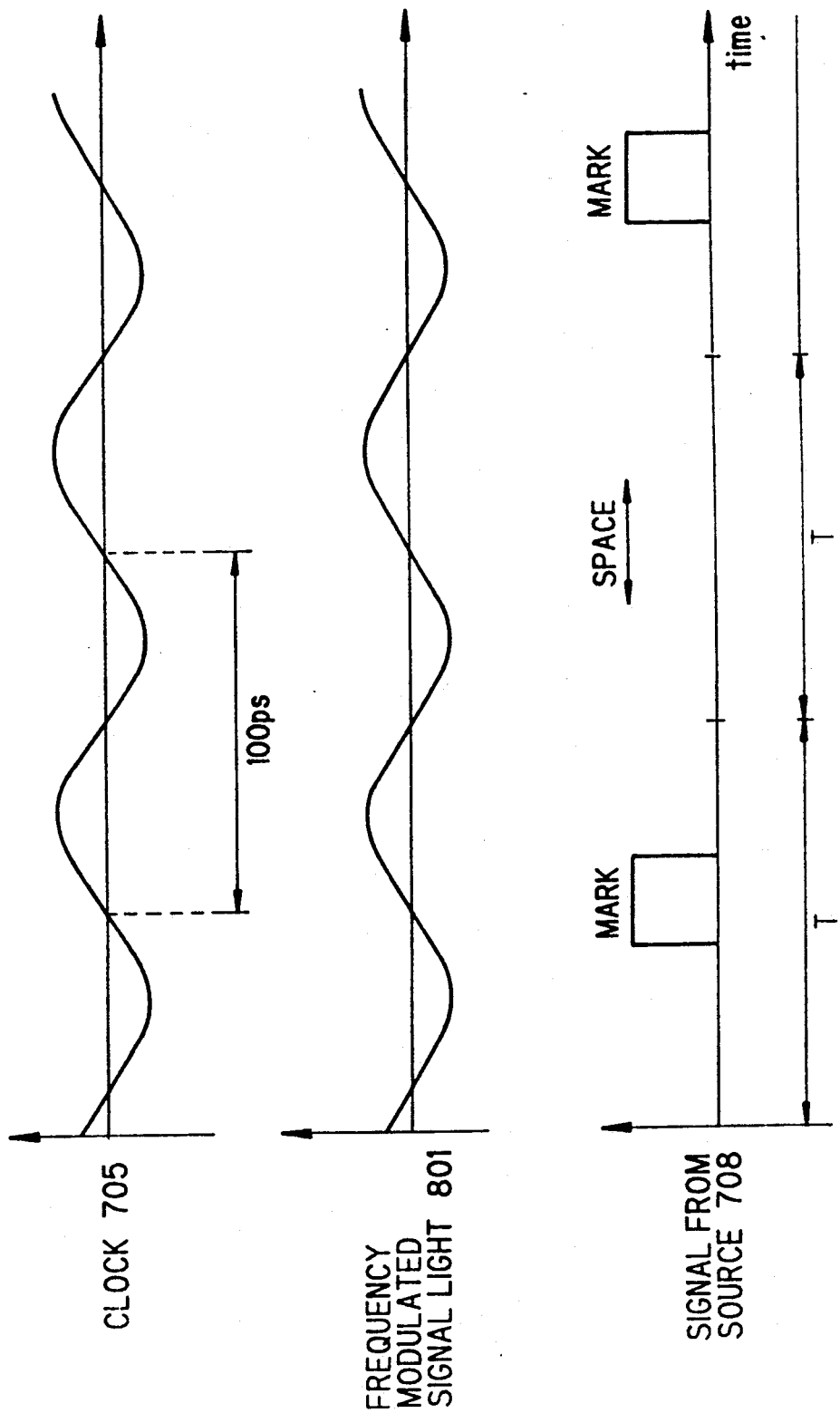
FIG. 8 is a timing chart showing signals in the third preferred embodiment.

FIG. 8 shows phase relations of the clock signal, the frequency-modulated signal light 801 and the RZ signal supplied from the signal source 708. As apparent from the phase relations, the frequency-modulated signal light 801 is low in frequency at a rising portion of a mark, and high in frequency at a falling portion thereof. This is realized by adjusting a delay amount of the variable delay and attenuating circuit 706.

Figure 9:
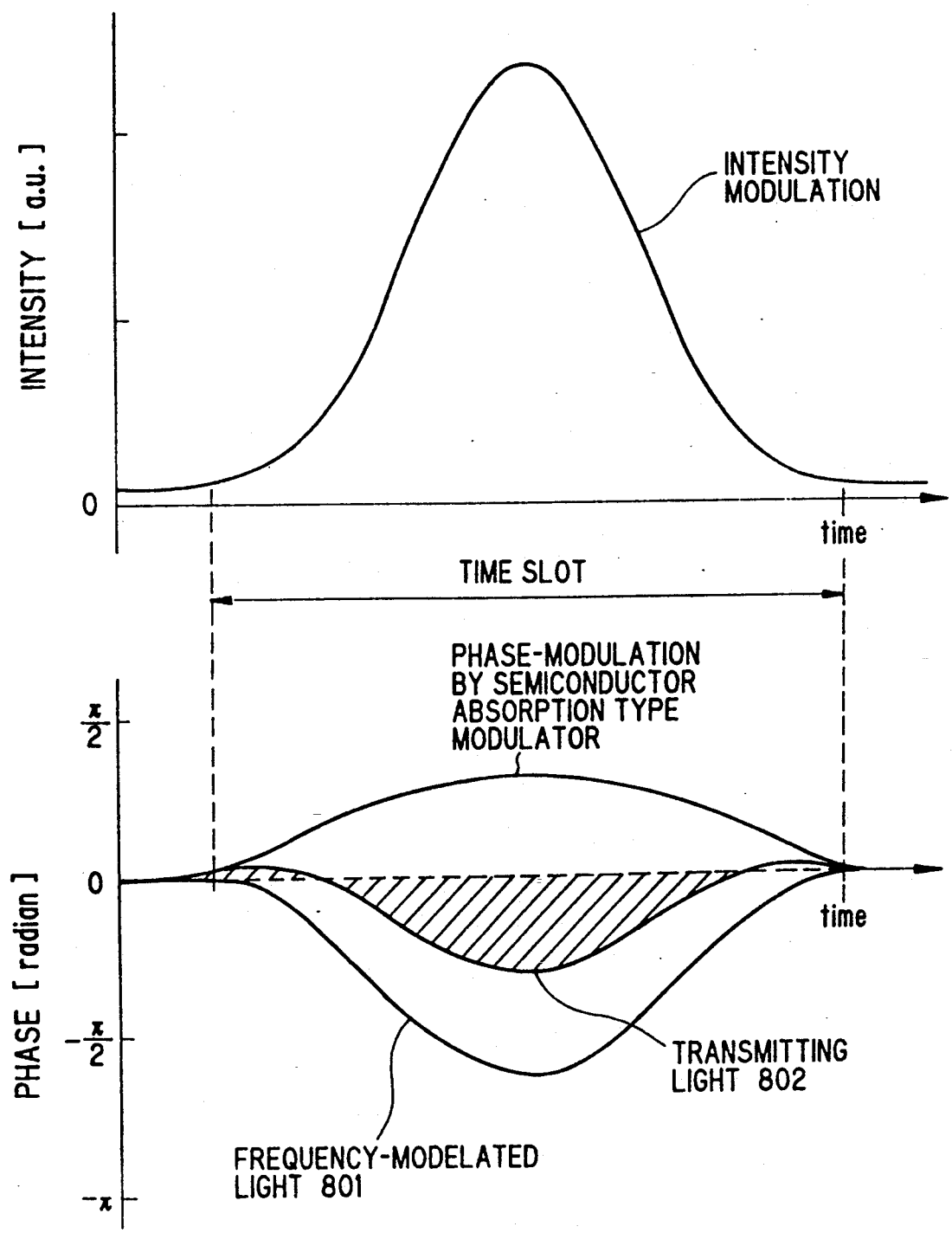
FIG. 9 is a graph showing a relation between intensity and phase in the third preferred embodiment.

FIG. 9 shows phases of the frequency-modulated signal light 801, and the transmitting light 802 at the time of a mark. The signal light 801 emitted from the semiconductor laser 701 is modulated in intensity by the semiconductor electro-absorption modulator 709. Simultaneously, the signal light 801 is subject to undesirable phase-modulated caused by the semiconductor electro-absorption modulator 709. This phase-modulation is proportional to a logarithm of the intensity modulated component, and becomes a convex shape extending upwardly direction in one time-slot. On the other hand, the signal light 801 modulated in frequency by the clock signal is modulated in phase to have a convex shape extending downwardly. The shift amount of this phase-modulated changes dependent upon the degree of frequency-modulated. In this case, an optimum prechirp state corresponds to a phase of the transmitting signal light 802. Thus, the phase of the transmitting signal light 802 is controlled to be in the optimum prechirp state by adjusting the phase shift amount of the signal light 801 of the frequency modulated.

In the third preferred embodiment, an experiment using the optical transmitting apparatus was carried out. In a preparatory experiment, a transmission using the RZ signal of 5 Gb/s which is the same bit rate as in the third preferred embodiment was carried out by using an ideal external modulator of $LiNbO_3$. As a result, an approximately 1 dB dispersion degradation power penalty was observed after a transmission of approximately 180 km using a normal dispersion optical fiber having zero-dispersion at a band of 1.3 μm. On the other hand, the semiconductor electro-absorption external modulator was used for an external modulator, and the variable delay and attenuating circuit 706 was adjusted to provide predetermined delay and attenuation amounts in the experiment using the third preferred embodiment. The result of this experiment is shown in FIG. 10.

Figure 10A:
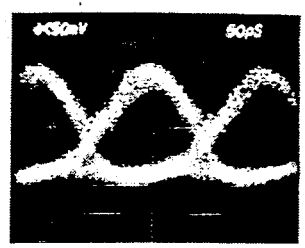
FIGS. 10A to 10C are explanatory diagrams showing waveforms of transmitting and transmitted signal lights in the third preferred embodiment.
Figure 10B:
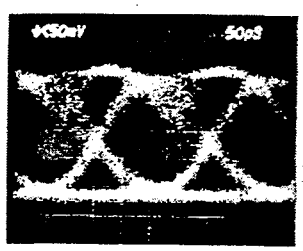
Figure 10C:
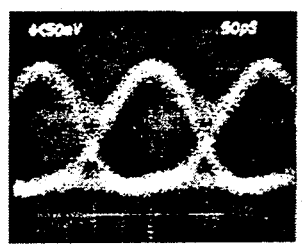

In FIG. 10, waveforms of a transmitting signal light (prior to a transmission), a transmitted signal light in case of no prechirp after 150 km transmission, and a transmitted signal light in case of prechirp after 150 km transmission are shown. As apparent from this result, it was observed that the waveform of the transmitted signal light which is the same as that of the transmitting signal light was obtained in case of prechirp, although the waveform was distorted in case of no prechirp due to a significant interference among symbols.

Figure 11:
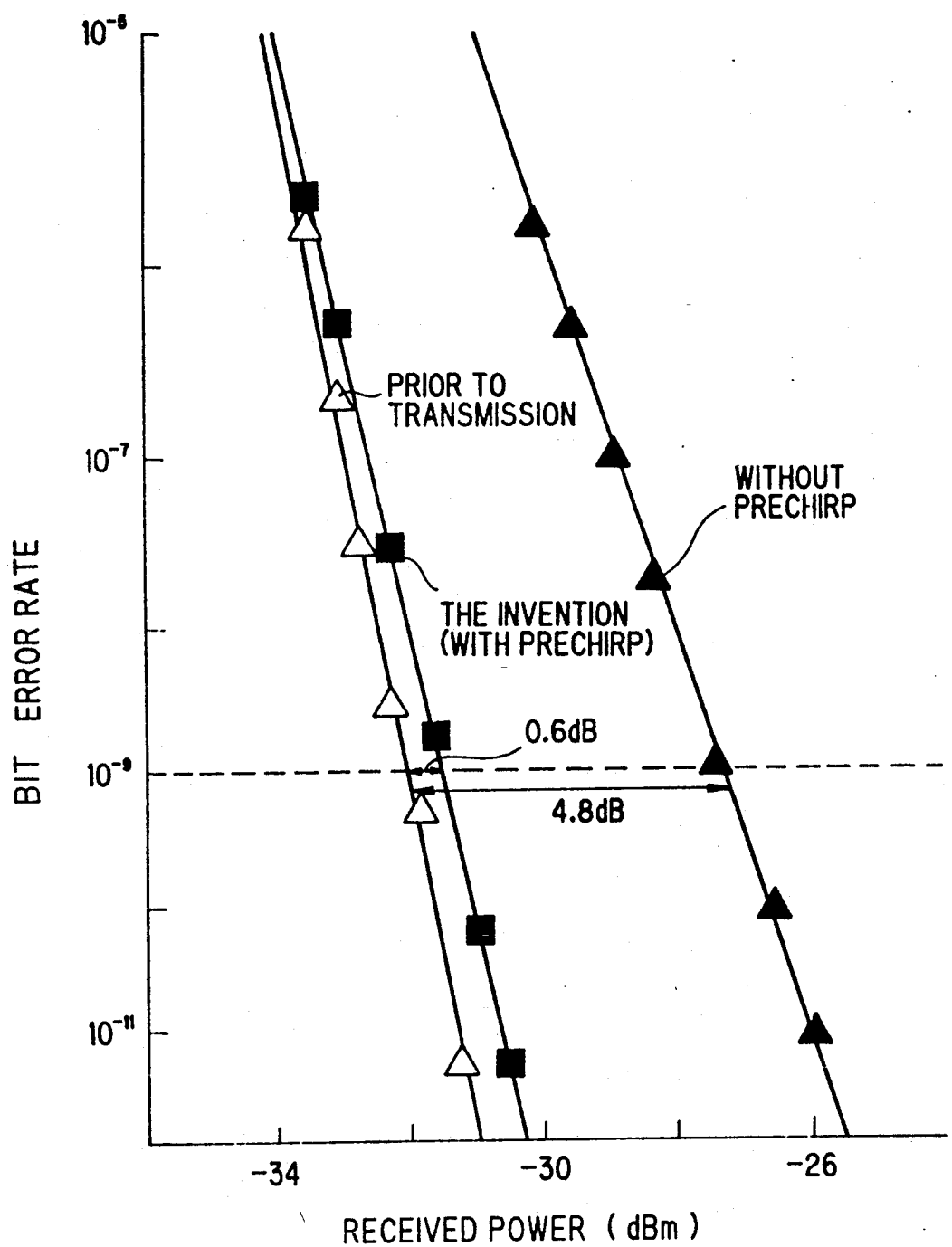
FIG. 11 is a graph showing a bit error rate relative to a received power in the third preferred embodiment.

FIG. 11 shows bit error rate characteristics in case of prechirp and no prechirp. As apparent from the bit error rate, a degradation amount after 150 km transmission is suppressed to be 0.6 dB in case of prechirp.

Figure 12:
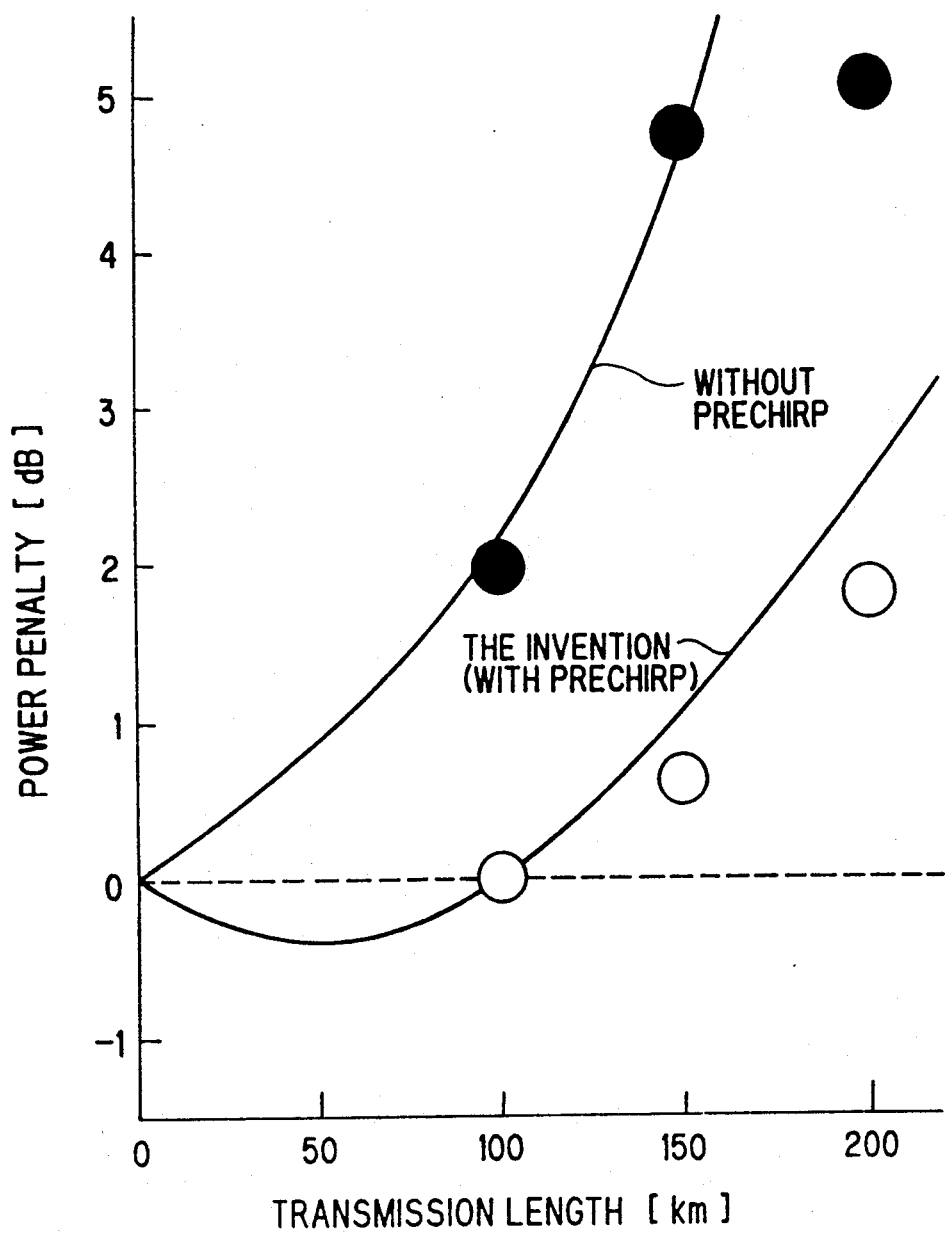
FIG. 12 is a graph showing a dispersion power penalty dependence on a transmission length in the third preferred embodiment.

FIG. 12 shows a dispersion power penalty dependence on a transmission length. In addition to the experiment of 150 km, a transmission experiment of 100 km and 200 km was carried out. From the result of these experiments, it was confirmed that the almost same degradation as the degradation of 1 dB in the 180 km transmission using the ideal modulator of LiNbO$_3$ was obtained by adjusting the delay and attenuation amounts of the variable delay and attenuating circuit 706, even if the semiconductor electro-absorption modulator was used.

Although the preferred embodiments are explained above, the invention may be modified in another preferred embodiment. In the first preferred embodiment, for instance, the light source of a 1.5 μm band may be replaced by a light source of a 1.3 μm band, and another wavelength band. An optical amplifier may be provided to compensate the loss of light intensity in the division or an output light supplied from the light source. The external modulator of LiNbO$_3$ may be replaced by a semiconductor external modulator. The light delay may be carried out between the external modulator and the multiplexer, and at both places between the optical coupler and the external modulator and between the external modulator and the multiplexer. The bit rate is not limited to 5 Gb/s, but to 2 Gb/s, 10 Gb/s, etc. sine-wave for frequency-modulated of an output light emitted from the semiconductor laser light source may be replaced by a saw-tooth waveform, a triangle waveform, etc. The transmission line may be provided with an optical amplifying repeater at predetermined points thereof, and is not limited to an optical fiber having zero-dispersion wavelength of a 1.3 μm band. The direct detection may be replaced in the receiving apparatus by a heterodyne detection.

Similarly, the same modifications may be made in the second and third preferred embodiments.

In the third preferred embodiment, especially, the semiconductor electro-absorption modulator may be replaced by a modulator of LiNbO$_3$, and a frequency may be changed, if it is times of an integer relative to a frequency of the clock signal. Operation of the first to third preferred embodiments will be summarized here. A transmission line can be longer in theory by the prechirp method, when a pulse width of one pulse in expanded to be more than one time-slot, and optical frequencies are adequately varied in the pulse. However, if the pulse width is extended to be more than one time-slot, it is impossible to adequately vary optical frequencies at portions overlapping adjacent pulses. In the first preferred embodiment, the transmitting signal light is divided into two signal lights to be propagated through two optical systems by the optical dividing circuit. In each optical system one time-slot is set to be longer that one time-slot of the original transmitting signal light. In this state, optimum optical frequency variation is set in the divided transmitting signal light which are then combined with each other. For instance, when one transmitting signal light is divided to be propagated through two optical systems, one time-slot can be twice as long as one-time-slot of the original signal light at the maximum in each optical system. A pulse width of two divided transmitting signal light is extended in the lengthened time-slot, and optical frequency variation is applied to the two signal lights which are then combined together. In the first preferred embodiment, an optical fiber delay line of a predetermined fixed-length is used to provide a time difference between the two divided transmitting signal lights. In each optical system, a RZ format having a ½ time-slot width is used for a modulation signal. One of the divided signal lights is shifted from the other by ½ time-slot by use of the optical fiber delay line, so that the two signal lights are combined to provide an NRZ format signal having a bit rate twice that of an original RZ format signal. This NRZ format-transmitting signal light is an optimum prechirp wave having the maximum permissible dispersion for a transmitting line. Thus, it is understood that an optimum prechirp wave is obtained for a signal such as an NRZ format having a pulse width of more than one time-slot to provide a large permissible transmission line dispersion as compared to a system using a RZ format. If the number n of dividing the transmitting signal light is more than two (n>2), a pulse width of a transmitting signal light can be extended by a width of n times the original width.

In the second preferred embodiment, the same principle is used as the first preferred embodiment in that a prechirp method is applied to transmitting signal systems in which a pulse width having more than one time-slot is used, provided that there is a difference that, although the optical coupler is used to divide the output light from the semiconductor laser in the first preferred embodiment, the separate semiconductor lasers are used for the divided optical systems. Therefore, the transmitting signal light can be large in power by eliminating a dividing loss induced in the optical coupler. In addition, the optical fiber delay line as used in the first preferred embodiment can be eliminated, because the time difference between the divided signal lights is provided in accordance with the adjustment of phases of the clock signal for modulating the semiconductor lasers and the modulated signals for modulating the external modulators.

In the first and second preferred embodiments, a power of the transmitting signal light is expected to be increased, because an ideal optical multiplexing having no loss can be carried out by the polarized multiplexing of lights. In addition, optical interference effect which tends to occur in combining the signal lights in the optical systems can be suppressed by the orthogonal polarized multiplexing, and inter-symbol interference resulted from adjacent light pulses can be also suppressed.

In the third preferred embodiment, even if a semiconductor electro-absorption modulator which is not an ideal external modulator is used, it is possible to provide an ideal prechirp wave, so that the optical transmitting apparatus can be small in size, and low in cost. In addition, the optical transmitting apparatus can be much smaller in size, because the semiconductor electro-absorption modulator is integrated with the semiconductor laser.

As described before, it is the condition to use an ideal modulator providing no phase-modulated, but only intensity-modulated in a frequency-modulation light obtained from a semiconductor laser which is modulated by modulating a current injected thereinto, when the aforementioned prechirp wave is generated in the optical transmitting apparatus. However, phase-modulated which is a function of intensity-modulated occurs in a transmitting signal light when a modulator such as a semiconductor electro-absorption modulator generating undesirable phase-modulation along with intensity-modulated is used. In the semiconductor electro-absorption modulator, for instance, this phase-modulated component P(t) is expressed in the below equation.

$$P(t) = \frac{\alpha}{2} \ln A(t)$$

Where α is a physical property of a semiconductor, a ratio between a real number portion and an imaginary number portion of a refractive index at the time of operation of the modulator, and A(t) is a light absorption amount of the modulator.

This phase variation is a variation, in which no phase-shift occurs, when the modulator output is large "mark" (A(t) = 1, pass), and a phase-shift occurs, when the modulator output is small "space" and is found to occur in the same period as intensity-modulation. Therefore, even if an ideal external modulator is not used, an ideal prechirp wave is obtained by modulating a current injected into a semiconductor laser. This injected current is modulated to cancel a phase-modulation component induced in a modulator generating undesirable phase-modulated in addition to an optimum modulation applied to the semiconductor laser. On the other hand, where an ideal prechirp wave is generated by use of an ideal external modulator and an RZ format, frequency-modulation which is nearly identical to an optimum frequency-shift is carried out in a pulse by using a clock signal of a sine-wave. Even in an external modulator such as a semiconductor electroabsorption modulator providing undesirable phase-modulated, a wave similar to an ideal prechirp wave is obtained in accordance with the adjustment of a frequency-shift amount and the way of the frequency-shift in an output signal light which is realized by varying an amplitude and a phase of a sine-wave clock signal. As a result, the aforementioned advantages are obtained in the third preferred embodiment.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An optical transmitting apparatus, comprising:
   a semiconductor laser light source for emitting a frequency-modulated light;
   a source of injection current;
   a clock signal source for generating a clock signal for modulating said injection current;
   means for applying said injection current to said semiconductor laser light source for modulating said emitted light in accordance with said injection current;
   means for adjusting an amplitude and a phase of said clock signal to modify the modulation of said injection current;
   n transmitting signal sources for generating n transmitting signals synchronous with said clock signal, where n is a positive integer;
   means for dividing said frequency-modulated light into n signal lights propagated through n light paths;
   n external modulators coupled to said light paths and responsive, respectively, to one of said transmitting signals, for modulating in-intensity said n divided signal lights to provide n intensity-modulated lights traveling in respective ones of said n light paths;
   means for providing a time difference among said n intensity-modulated lights; and
   means for combining said n intensity-modulated lights traveling through said light paths;
   wherein said adjusting means adjusts said amplitude and said phase of said clock signal, so that said n intensity-modulated lights are supplied to said light paths in a time-order of frequency components having slow to fast transmission speeds in compliance with a wavelength dispersion property of said light paths; and
   said providing means being provided at position selected from positions between said dividing means and a corresponding one of said external modulators and between said corresponding one and said combining means.

2. An optical transmitting apparatus, according to claim 1, wherein:
   said providing means is an optical fiber having a length corresponding to said time-difference.

3. An optical transmitting apparatus, according to claim 1, wherein n is two; and said combining means is a polarized multiplexer.

4. An optical transmitting apparatus, comprising:
   n semiconductor laser light sources for emitting n frequency-modulated lights to travel through n light paths, where n is a positive integer;
   n sources of injection current;
   a clock signal source for generating a clock signal for modulating said sources of injection current;
   means for applying said injection current to said semiconductor laser light source for modulating said emitted light in accordance with said injection currents;
   n means for adjusting an amplitude and a phase of said clock signal to provide n modulation signals for modulating said injected currents;
   n transmitting signal sources for generating n transmitting signals synchronous with said clock signal;
   n external modulators coupled to said light paths and responsive, respectively, to one of said transmitting signals, for modulating in intensity said n frequency-modulated lights to provide n intensity-modulated lights traveling in respective ones of said n light paths; and
   means for combining said n intensity-modulated lights traveling through said light paths to be propagated through a transmission line;
   wherein said n adjusting means adjust said amplitude and said phase of said clock signal, so that a time difference is introduced among said n intensity-modulated lights, and wherein said intensity-modulated lights are supplied to said transmission line in a time-order of frequency components having slow to fast transmission speeds in compliance with a wavelength dispersion property of said transmission line.

5. An optical transmitting apparatus, according to claim 4, wherein n is two; and said combining means is a polarized multiplexer.

6. An optical transmitting apparatus, comprising:
- a semiconductor laser light source for emitting a frequency-modulated light;
- a source of injection current;
- means for applying said injection current to said semiconductor laser light source for modulating said emitted light in accordance with said injection current;
- an external modulator for modulating said frequency-modulated light to produce an intensity-modulated transmitting signal light responsive to a transmitting signal;
- a clock signal source for generating a clock signal having a frequency of n times that of said transmitting signal, said clock signal modulating said injected current, where n is an integer; and
- means for adjusting an amplitude and a phase of said clock signal;
- wherein said adjusting means adjusts said amplitude and said phase of aid clock signal to adjust a frequency shift amount and a phase of said frequency-modulated light, so that an undesirable phase-modulation component induced in said intensity-modulation of said eternal modulator is compensated, and said intensity-modulated transmitting signal light is supplied to a transmission line in a time-order of frequency components having slow to fast transmission speeds in compliance with a wavelength dispersion property of said transmission line.

* * * * *

UNITED STATES PATENT AND TRADEMARK OFFICE
CERTIFICATE OF CORRECTION

PATENT NO. : 5,184,243
DATED : February 2, 1993
INVENTOR(S) : HENMI et al.

It is certified that error appears in the above-identified patent and that said Letters Patent is hereby corrected as shown below:

Col. 7, line 68, delete "sine.wave" and insert --sine-wave--

Col. 10, line 36, delete "[he" and insert --the--

Signed and Sealed this

Thirtieth Day of November, 1993

Attest:

BRUCE LEHMAN

Attesting Officer

Commissioner of Patents and Trademarks